(12) United States Patent
Herron

(10) Patent No.: US 8,354,026 B2
(45) Date of Patent: Jan. 15, 2013

(54) CENTER TUBE CONFIGURATION FOR A MULTIPLE SPIRAL WOUND FORWARD OSMOSIS ELEMENT

(75) Inventor: John R. Herron, Corvallis, OR (US)

(73) Assignee: Hydration Systems, LLC, Scottsdale, AZ (US)

( * ) Notice: Subject to any disclaimer, the term of this patent is extended or adjusted under 35 U.S.C. 154(b) by 388 days.

(21) Appl. No.: 12/720,633

(22) Filed: Mar. 9, 2010

(65) Prior Publication Data

US 2010/0224550 A1 Sep. 9, 2010

Related U.S. Application Data

(60) Provisional application No. 61/158,714, filed on Mar. 9, 2009.

(51) Int. Cl.
*B01D 63/06* (2006.01)
*B01D 63/10* (2006.01)

(52) U.S. Cl. ........... 210/321.74; 210/321.6; 210/321.78; 210/321.83; 210/321.85; 210/321.87; 210/323.2; 210/321.76; 210/335; 210/336; 210/346; 210/347; 210/497.1

(58) Field of Classification Search ............... 210/321.6, 210/321.74, 312.78, 321.83, 321.85, 321.87, 210/323.2, 321.76, 335, 336, 346, 347, 497.01
See application file for complete search history.

(56) References Cited

U.S. PATENT DOCUMENTS

| 4,033,878 | A | | 7/1977 | Foreman et al. | |
|---|---|---|---|---|---|
| 5,212,948 | A | * | 5/1993 | Gillingham et al. | 60/288 |
| 6,292,628 | B1 | * | 9/2001 | Khalaf | 392/445 |
| 2004/0089600 | A1 | * | 5/2004 | Haq et al. | 210/337 |
| 2007/0274842 | A1 | * | 11/2007 | Campen et al. | 417/53 |

* cited by examiner

*Primary Examiner* — John Kim
(74) *Attorney, Agent, or Firm* — Fennemore Craig, P.C.

(57) ABSTRACT

A center tube is disclosed which allows a draw solution to flow through all membrane elements in a membrane system in parallel. The center tube may include a cylindrical wall with two open ends and a barrier element there between separating an upstream chamber and a downstream chamber within the cylindrical wall. At least one non-perforated bypass tube may be located substantially within the cylindrical wall, which extends a length of the downstream chamber and/or the upstream chamber so that the upstream chamber is configured to communicate with a second upstream chamber of a second center tube and/or the downstream chamber is configured to communicate with a second downstream chamber of the second center tube.

12 Claims, 3 Drawing Sheets

CENTER TUBE CONFIGURATION FOR A MULTIPLE SPIRAL WOUND FORWARD OSMOSIS ELEMENT

CROSS-REFERENCE TO RELATED APPLICATION

This application claims priority to the provisional application entitled "CENTER TUBE CONFIGURATION FOR A MULTIPLE SPIRAL WOUND FORWARD OSMOSIS ELEMENT", Ser. No. 61,158,714, filed Mar. 9, 2009, the entire disclosure of which is hereby incorporated herein by reference.

BACKGROUND

1. Technical Field

This document relates to a center tube configuration for a multiple spiral wound forward osmosis element.

2. Background

A common design for membrane elements in industrial scale systems uses flat sheet membrane rolled into spiral elements. This membrane element design has a series of membrane envelopes which are sealed to, and communicate with, a perforated central core tube. Spacer nets are inserted into the envelopes and between the envelopes, then the envelopes are wrapped tightly around the central core. The elements are then loaded end-to-end in long housings and the water to be filtered is pumped axially down the housing so that it flows through the spacer nets on the outside of the envelopes. Applied pressure then forces water through the membrane. The nets inside the membrane envelopes allow the filtered water to pass to the center tubes which convey water out of the housing.

Interest has gained in large scale forward osmosis (FO) applications such as seawater desalination, municipal wastewater reduction, production of fertilizer from methane bioreactor waste, and the like. All of these applications require industrial scale systems with thousands of square meters of FO membrane.

Unlike pressure driven filtration, FO requires a second fluid, or osmotic agent (OA) or brine, to pull water across the membrane. In a spiral wound FO design, OA must be brought to flow through the entire inside of the membrane envelopes, while the fluid to be concentrated (i.e., feed fluid or solution) flows through the spacers on the outside of the envelopes. Osmosis causes the feed fluid to be concentrated while consequently diluting the OA. Thus, in a spiral wound FO system there is a feed solution that provides the contaminated water source for purification and a draw solution that provides an osmotic agent, such as syrup or brine.

Such FO spiral wound systems can be used for single elements with at most 5 psi pressure drops. However, there are significant problems associated with scaling up such single FO spiral wound systems because if the elements are connected serially, the pressure drops are additive and reduce the utility of such systems as higher capacity water purification systems.

SUMMARY

Aspects of this document relate to a center tube which allows osmotic agent (OA) or brine (i.e., draw solution) to flow through all membrane elements in a housing in parallel. These aspects may include, and implementations may include, one or more or all of the components and steps set forth in the appended CLAIMS, which are hereby incorporated by reference.

In one aspect, a center tube is disclosed. The center tube may include a cylindrical wall with two open ends. A barrier element may be located within the cylindrical wall between the two open ends. An upstream chamber and a downstream chamber may be within the cylindrical wall separated from each other by the barrier element. At least one non-perforated bypass tube may be located substantially within the cylindrical wall, the at least one non-perforated bypass tube extending a length of one of the downstream chamber, the upstream chamber, and both the upstream and the downstream chambers so that one of the upstream chamber is configured to communicate with a second upstream chamber of a second center tube, the downstream chamber is configured to communicate with a second downstream chamber of the second center tube, and both the upstream chamber and the downstream chamber are configured to communicate with a second upstream chamber and a second downstream chamber respectively of a second center tube.

Particular implementations may include one or more or all of the following.

The cylindrical wall may include at least two perforations there through, one perforation in fluid communication with the upstream chamber and the other perforation in fluid communication with the downstream chamber.

The barrier element may be located at about a midpoint of the center tube.

The center tube may include opposing upstream and downstream barrier elements located at each open end of the center tube respectively. The at least one non-perforated bypass tube extends out through one of the barrier element and the upstream barrier element, the barrier element and the downstream barrier element, and the barrier element and both the upstream and downstream barrier elements. The upstream and downstream barrier elements may each include a sealable stab and a stab receptacle. The at least one non-perforated tube may include: a feed bypass tube extending the length of the downstream chamber out through the barrier element and through the downstream barrier element with no fluid communication with the downstream chamber; and an exit bypass tube extending the length of the upstream chamber out through the barrier element and through the upstream barrier element with no fluid communication with the upstream chamber.

In another aspect, a spiral wound membrane element is disclosed. The spiral wound membrane element may include a center tube as previously described and a membrane envelope coupled to and in fluid communication with the center tube.

Particular implementations may include one or more or all of the following.

The upstream and downstream chambers comprise a torturous interconnection path through the membrane envelope.

In another aspect, a spiral wound membrane system is disclosed which allows a draw solution to flow through the system in parallel. The spiral wound membrane system may include a stack of at least two membrane elements as previously described.

Particular implementations may include one or more or all of the following.

Each membrane element may include a center tube that includes: a cylindrical wall with two open ends; a barrier element within the cylindrical wall between the two open ends; opposing upstream and downstream barrier elements located at each open end respectively; an upstream chamber and a downstream chamber within the cylindrical wall separated from each other by the barrier element; a feed bypass tube located substantially within the cylindrical wall extending the length of the downstream chamber out through the barrier element and through the downstream barrier element with no fluid communication with the downstream chamber; and an exit bypass tube located substantially within the cylindrical wall extending the length of the upstream chamber out through the barrier element and through the upstream barrier element with no fluid communication with the upstream chamber; and a membrane envelope coupled to and in fluid communication with the center tube; wherein a set of feed bypass tubes allows concentrated draw solution to be conveyed independently to a draw solution feed side of each membrane element, while a set of exit bypass tubes allows diluted draw solution to be conveyed independently out of the stack.

The stack of at least two membrane elements may have only a single draw solution and feed connection at each end of the system while still providing draw solution flow through each membrane element in a parallel configuration.

The center tubes and barrier elements may form an inlet and an outlet manifold, such that all the upstream chambers of the center tubes are connected together in parallel and all of the downstream chambers of the center tubes are connected together in parallel.

The upstream and downstream chambers of each center tube may include a torturous interconnection path through each membrane envelope respectively.

In another aspect, a plurality of spiral wound elements is disclosed. The plurality of spiral wound elements may each have a first, second and so on perforated center tube, each center tube having two open ends, and a plurality of spiral wound membrane envelopes each having a feed solution communicating with the membrane envelopes and a draw solution communicating with the center tubes. The spiral wound elements are arranged end-to-end within a cylindrical housing, and each center tube has two chambers, an upstream chamber and a downstream chamber, separated from each other by a barrier element. The upstream chamber of the first center tube communicates with the upstream chamber of a neighboring or subsequent center tube, and the downstream chamber communicates of the first center tube communicates with the downstream chamber of a neighboring center tube.

Particular implementations may include one or more or all of the following.

The upstream chamber of the first center tube communicates with the upstream chamber of a neighboring center tube by means of a smaller diameter (than the center tube) non-perforated tube passing the first center tube and communicating with the second center tube and so on.

The systems of center tube barriers form an inlet and an outlet manifold, such that all the upstream chambers of each center tube are connected together in parallel and all of the outlet downstream chambers of each center tube are connected together in parallel.

The non-perforated tube passing the center tube is connected to a sealable stab and stab receptacle located at the open ends of each center tube.

In another aspect, an apparatus for supplying osmotic agent (i.e., draw solution) in a parallel fashion to a plurality of membrane envelopes configured in a stack of spiral wound membrane elements contained within a single housing is disclosed. The apparatus may include a spiral wound membrane center tube having two open ends and a cylindrical wall, and a plurality of perforations throughout the cylindrical wall, wherein a sealable stab and a stab receptacle are located each open end of the membrane element center tube, wherein a barrier element is provided at about a midpoint of the center tube element to divide the center tube into an upstream portion and a downstream portion. From about one to up to 100 membrane envelopes may be included, wherein each membrane envelope comprises two rectangular sheets of membrane having seals on three sides to form an inner envelope chamber that fluidly communicates with the interior of the membrane center tube through the plurality of perforations, and wherein a partial length barrier is provided within each membrane envelope to increase fluid flow paths. A plurality of connecting pipes and barrier penetrations may be included, wherein the upstream portion in a first chamber is interconnected to an upstream portion in a second chamber and so on, and wherein a downstream portion in the first chamber is interconnected to a downstream chamber to a second chamber and so on.

Particular implementations may include one or more or all of the following.

The upstream and downstream portions have a torturous interconnection path through the membrane envelopes.

The foregoing and other aspects, features, and advantages will be apparent to those of ordinary skill in the art from the DESCRIPTION and DRAWINGS, and from the CLAIMS.

BRIEF DESCRIPTION OF DRAWINGS

Implementations will hereinafter be described in conjunction with the appended DRAWINGS (which are not necessarily to scale), where like designations denote like elements, and.

DESCRIPTION

This document features center tube implementations for supplying osmotic agent (OA) or brine (i.e., draw solution) in a parallel fashion to a plurality of membrane envelopes configured in a stack of spiral wound membrane elements contained within a single housing. There are many features of center tube implementations disclosed herein, of which one, a plurality, or all features or steps may be used in any particular implementation.

In the following description, reference is made to the accompanying DRAWINGS which form a part hereof, and which show by way of illustration possible implementations. It is to be understood that other implementations may be utilized, and structural, as well as procedural, changes may be made without departing from the scope of this document. As a matter of convenience, various components will be described using exemplary materials, sizes, shapes, dimensions, and the like. However, this document is not limited to the stated examples and other configurations are possible and within the teachings of the present disclosure.

Overview

A spiral wound membrane design configuration is inexpensive and can provide one of the greatest membrane surface areas in a vessel per cost (it can have a high membrane density (about 30 m$^2$ per 20 cm diameter by 100 cm long element)).

In general, a spiral wound configuration, a permeate spacer, a feed spacer and two membranes can be wrapped around a perforated tube and glued in place. The membranes are wound between the feed spacer and the permeate spacer. Feed fluid is forced to flow longitudinally through the module through the feed spacer, and fluid passing through the membranes flows inward in a spiral through the permeate spacer to the center tube. To prevent feed fluid from entering the permeate spacer, the two membranes are glued to each other along their edges with the permeate spacer captured between them. The feed spacer remains unglued. Module assemblies are wound up to a desired diameter and the outsides are sealed.

Figure 1:
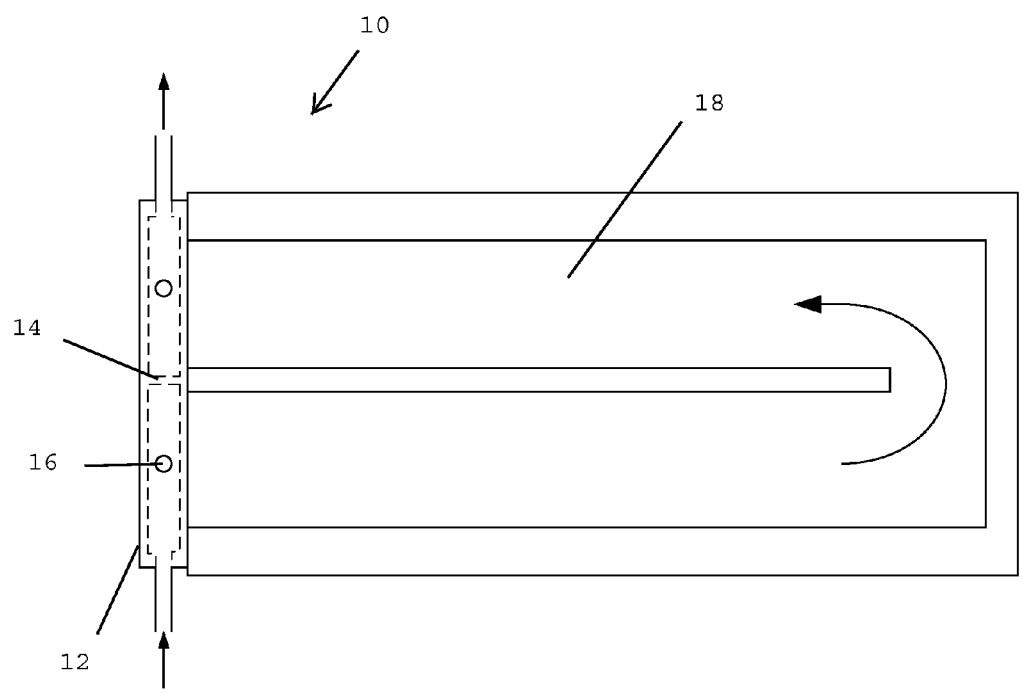
FIG. 1 is a broken away plan view of an unrolled spiral wound forward osmosis (FO) membrane element.

For the exemplary purposes of this disclosure, an unrolled spiral wound forward osmosis (FO) membrane element 10 is depicted in FIG. 1. This membrane element 10 forces a draw solution (i.e., osmotic agent (OA) or brine) to flow through the entire, single membrane envelope 18. Specifically, the concentrated OA is pumped into one end of a center tube 12 with perforations 16. A barrier element 14 fixed halfway down the tube 12 forces the OA fluid flow through the perforations 16 into the membrane envelope 18. A glue barrier is applied to the center of the membrane envelope 18 so that fluid must flow to the far end of the membrane where a gap allows it to cross over to the other side of the membrane envelope 18 then back into the second half of the center tube 12 and out of the element 10. While FIG. 1 shows a single envelope 18 in a flat configuration, in an actual element there may be multiple envelopes and, instead of being flat, they are wound/wrapped around the center tube 12 with feed fluid spacers between the envelopes. A similar FO element design was taught in U.S. Pat. No. 4,033,878 (the entire disclosure of which is hereby incorporated by reference herein).

An issue which arises in multiple-element industrial-scale FO membrane housings is the plumbing of the OA flow. Generally, in operation, multiple modules are placed in a tubular housing and fluid is pumped through them in series. Thus, for example, the center tube 10 in FIG. 1 and in U.S. Pat. No. 4,033,878 has only a single inlet and exit so if elements 10 are stacked together, OA must second element 10. As more elements 10 are stacked in a housing it becomes impractical to send the OA through each element 10 in series. The additive pressure drops from the torturous, serial pathway becomes so large that a sufficient flow rate of OA is impossible.

Center Tube

Figure 2:
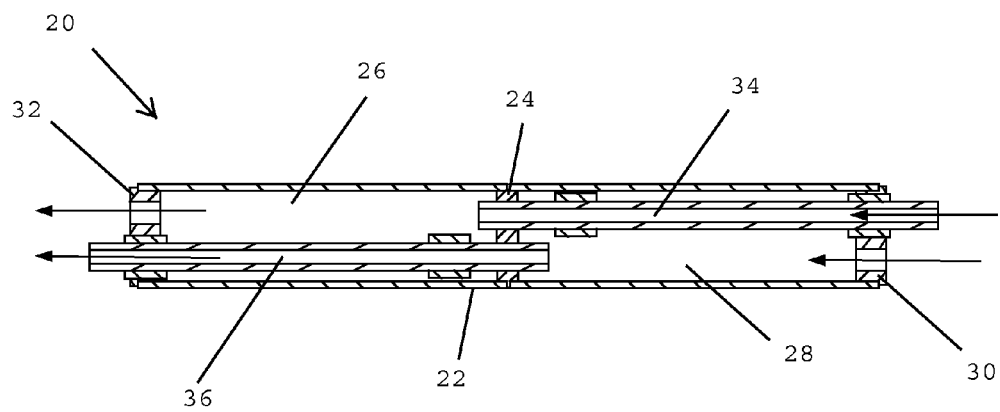
FIG. 2 is an axial cross-sectional view of an implementation of a center tube.

There are a variety of center tube implementations that allow a draw solution to flow through all membrane elements of a membrane system that may be contained in a single housing in parallel. Notwithstanding, turning to FIGS. 2 and 3 and for the exemplary purposes of this disclosure, a perforated spiral wound membrane center tube 20 is shown.

Perforated spiral wound membrane center tube 20 may include at least two perforations (e.g., a plurality) through its wall 22 (e.g., a cylindrical wall) that are in fluid communication with two internal chambers, an upstream chamber 28 and a downstream chamber 26, separated from each other by a barrier element 24. The barrier element 24 may be located at about the midpoint of the center tube 10. Sealable barrier elements 30 and 32 are located at each open end of center tube 20 respectively and may each comprise a sealable stab and a stab receptacle. Barrier elements 24, 30, and 32 all include barrier penetrations.

Perforated spiral wound membrane center tube 20 may comprise at least one internal small diameter (smaller in diameter than the center tube 10) non-perforated tube located substantially within the outer center tube 20. The at least one non-perforated tube extends the length of the downstream and/or the upstream chambers out through the barrier penetrations of the barriers so that the upstream chamber of a first center tube fluidly communicates with the upstream chamber of a neighboring center tube and so on and/or the downstream chamber of a first center tube fluidly communicates with the downstream chamber of a neighboring center tube and so on.

For the exemplary purposes of this disclosure, the at least one internal non-perforated tube may comprise two tubes. In particular, a feed bypass tube 36 may be located substantially within the center tube 20 and extends the length of the downstream chamber 26 out through barriers 24 and 32. The feed bypass tube 36 moves osmotic agent (OA) from the upstream chamber 28 through the barrier 24 and out of the center tube 20 (to the next tube to the left side, not shown) without mixing it within the downstream chamber 26. Similarly, the downstream exit from an upstream element (not shown but located to the right of the illustrated center tube 20) feeds diluted OA through an exit bypass tube 34 (located substantially within the center tube 20 and extending the length of the upstream chamber 28 out through barriers 24 and 30) into the downstream chamber 26 without mixing it within the upstream chamber 28.

Spiral Wound Membrane Element

There are a variety of spiral wound FO membrane element implementations. Notwithstanding, turning to FIGS. 1-3 and for the exemplary purposes of this disclosure, a spiral wound FO membrane element is shown.

The spiral wound membrane element is similar to element 10 as previously described, but includes center tube 20 as previously described instead of center tube 10. Accordingly, the spiral wound element includes a perforated center tube 20 and a spiral wound membrane envelope (such as envelope 18), and having a feed solution communicating with the membrane envelope and a draw solution communicating with the center tube. The membrane envelope may include two rectangular sheets of membrane having seals on three sides to form an inner envelope chamber that fluidly communicates with the interior of the membrane center tube 10 through the plurality of perforations, and wherein a partial length barrier is provided within each membrane envelope to increase fluid flow paths. The upstream and downstream chambers may have a torturous interconnection path through the membrane envelope.

Spiral Wound Membrane System

There are a variety of spiral wound FO membrane system implementations which allow the OA to flow through all elements in a housing in parallel. In general, the membrane system may include at least one element. For example, there may be a stack of at least two elements. For another example, there may be from about one to up to 100 elements (including membrane envelopes). The center tubes of the elements have barriers at the ends and at the midpoint, and each of these barriers is penetrated by two bypass pipes. One set of bypass pipes allows concentrated OA to be conveyed independently to the OA feed side of each element, while the second set of bypass pipes conveys the diluted OA out of the stack. This arrangement allows the elements to be nested together in a stack which has only a single OA and feed connection at each end, but yet provides the OA flow through each element in a parallel configuration.

Thus, a plurality of spiral wound elements are arranged end-to-end (and then usually within a cylindrical housing). Each of the plurality of spiral wound elements has a first, second and so on perforated center tube each having two open ends, and a plurality of spiral wound membrane envelopes, and each having a feed solution communicating with the membrane envelopes and a draw solution communicating with the center tubes. Each center tube has two chambers, an upstream chamber and a downstream chamber, separated from each other by a barrier element. The upstream and downstream chambers may have a torturous interconnection path through the membrane envelopes. The upstream chamber of the first center tube communicates with the upstream chamber of a neighboring or subsequent center tube through a non-perforated bypass tube passing the first center tube, and the downstream chamber of the first center tube communicates with the downstream chamber of a neighboring center tube through a non-perforated bypass tube passing the first center tube. The center tubes and barriers form an inlet and an outlet manifold, such that all the upstream sections of the center tubes are connected together in parallel and all of the outlet downstream sections of the center tubes are connected together in parallel. The non-perforated bypass tubes passing the center tubes may be connected to sealable stabs and stab receptacles located at the open ends of each center tube.

Figure 3:
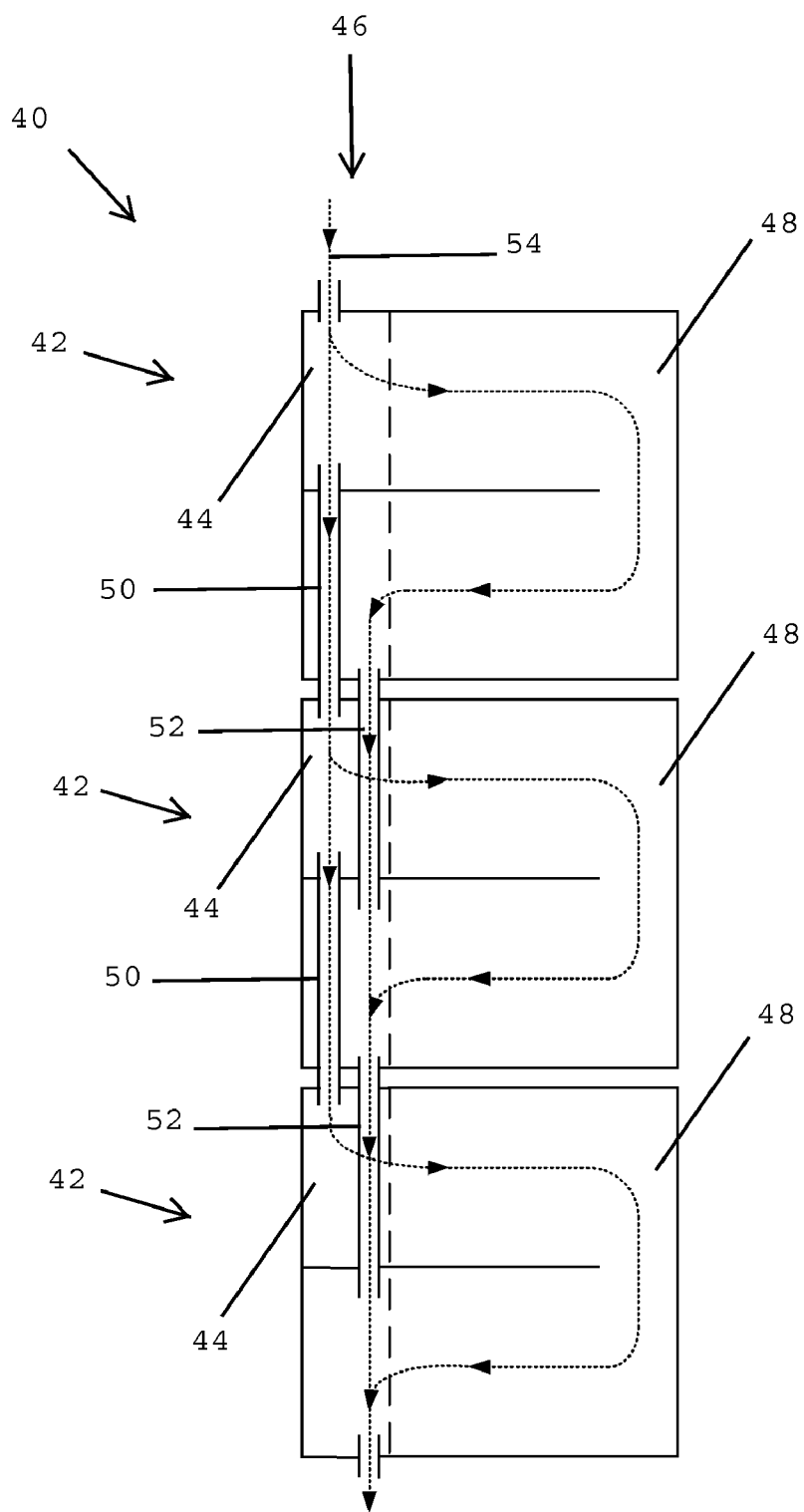
FIG. 3 is a schematic view of an implementation of a spiral wound membrane system.

Turning to FIG. 3 and for the exemplary purposes of this disclosure, a spiral wound FO membrane system 40 is shown. The OA flow 54 flows through a stack of three elements 42. The center tubes 44 have barriers at the ends and at the midpoint, and each of these barriers is penetrated by two pipes 50 and 52. One set of pipes 50 allows concentrated OA to be conveyed independently to the OA feed side of each element 42, while the second set of pipes 52 conveys the diluted OA from membrane envelopes 48 out of the stack. Collectively the center tubes 44 and barriers form an inlet and an outlet manifold 46, such that all the upstream chambers of each center tube 44 are connected together in parallel and all of the outlet downstream chambers of each center tube 44 are connected together in parallel.

Thus, such an arrangement allows the elements 42 to be nested together in a stack which has only a single OA and feed connection at each end, but yet provides the OA flow through each element 42 in a parallel configuration. That is, the OA flow path 54 goes through all center tubes 44 and through the membrane envelopes 48 in parallel through the smaller non-perforated bypass tubes 50 and 52 located within the outer center tubes 44.

Other Implementations

Many additional implementations are possible.

Figure 4:
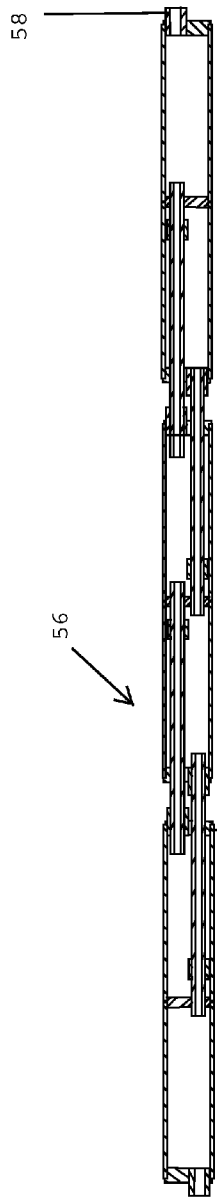
FIG. 4 is an axial cross-sectional view of three center tubes of another implementation of a spiral wound membrane system.
Figure 5:
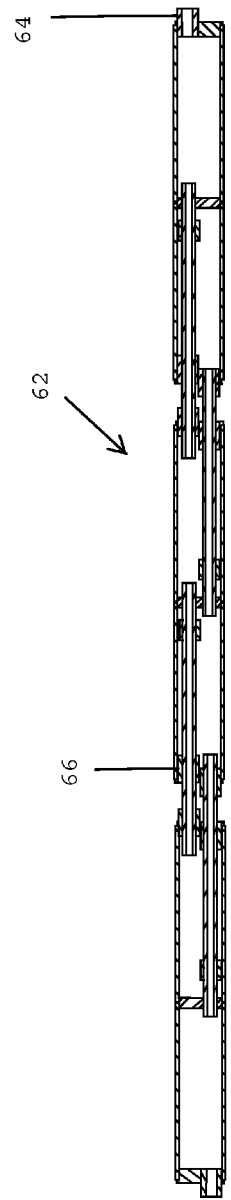
FIG. 5 is an axial cross-sectional view of three center tubes of still another implementation of a spiral wound membrane system.
Figure 6:
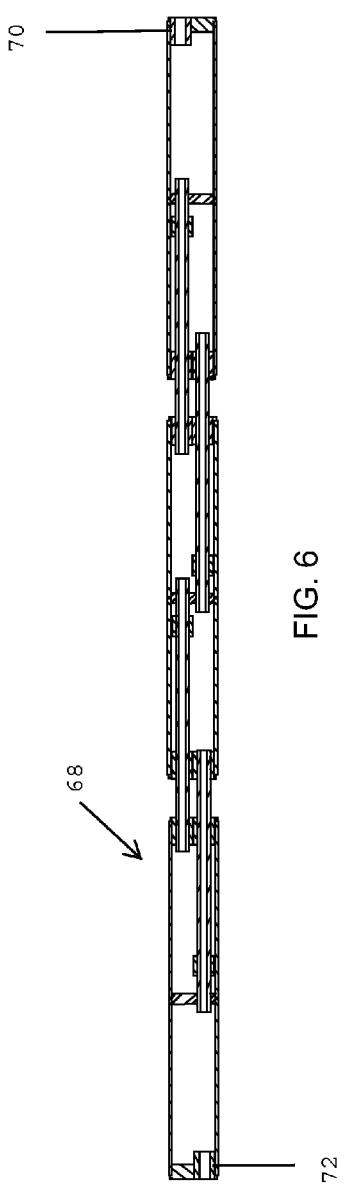
FIG. 6 is an axial cross-sectional view of three center tubes of yet another implementation of a spiral wound membrane system.

For the exemplary purposes of this disclosure, although there are a variety of spiral wound membrane system implementations, with reference to FIGS. 4-6, three spiral wound membrane systems are depicted respectively without showing their associated membrane envelopes. Each spiral wound membrane system comprises a manifold 56, 62, and 68 respectively each comprising three center tubes. Each manifold 56, 62, and 68 is substantially similar to manifold 46 already described. The principal differences are the sealable stabs and stab receptacles located at the open ends of each center tube. Manifold 56 includes stabs 58 and stab receptacles 60. Manifold 62 includes stabs 64 and stab receptacles 66. Manifold 68 includes stabs 70 and stab receptacles 72.

Further implementations are within the CLAIMS.

Specifications, Materials, Manufacture, Assembly

It will be understood that implementations are not limited to the specific components disclosed herein, as virtually any components consistent with the intended operation of a center tube, spiral wound FO membrane element, and/or spiral wound FO membrane system implementation may be utilized. Accordingly, for example, although particular components and so forth, are disclosed, such components may comprise any shape, size, style, type, model, version, class, grade, measurement, concentration, material, weight, quantity, and/or the like consistent with the intended operation of a center tube, spiral wound FO membrane element, and/or spiral wound FO membrane system implementation. Implementations are not limited to uses of any specific components, provided that the components selected are consistent with the intended operation of a center tube, spiral wound FO membrane element, and/or spiral wound FO membrane system implementation.

Accordingly, the components defining any center tube, spiral wound FO membrane element, and/or spiral wound FO membrane system implementation may be formed of any of many different types of materials or combinations thereof that can readily be formed into shaped objects provided that the components selected are consistent with the intended operation of a center tube, spiral wound FO membrane element, and/or spiral wound FO membrane system implementation. For example, the components may be formed of: rubbers (synthetic and/or natural) and/or other like materials; glasses (such as fiberglass), carbon-fiber, aramid-fiber, any combination thereof, and/or other like materials; polymers such as thermoplastics (such as ABS, Acrylic, Fluoropolymers, Polyacetal, Polyamide; Polycarbonate, Polyethylene, Polysulfone, and/or the like), thermosets (such as Epoxy, Phenolic Resin, Polyimide, Polyurethane, Silicone, and/or the like), any combination thereof, and/or other like materials; composites and/or other like materials; metals and/or other like materials; alloys and/or other like materials; any other suitable material; and/or any combination thereof.

For the exemplary purposes of this disclosure, the FO membrane may be made from a thin film composite RO membrane. Other FO membranes include, for example, a cellulose ester membrane cast by an immersion precipitation process on a porous support fabric such as woven or non-woven nylon, polyester or polypropylene, or preferably, a cellulose ester membrane cast on a hydrophilic support such as cotton or paper. The RO membrane may be rolled using a commercial thin film composite, sea water desalination membrane. The membranes used for the FO element (in any configuration) may be hydrophilic, membranes with salt rejections in the 80% to 95% range when tested as a reverse osmosis membrane (60 psi, 500 PPM NaCl, 10% recovery, 25° C.). The nominal molecular weight cut-off of the membrane may be 100 daltons. The membranes may be made from a hydrophilic membrane material, for example, cellulose acetate, cellulose proprianate, cellulose butyrate, cellulose diacetate, blends of cellulosic materials, polyurethane, polyamides. The membranes may be asymmetric (that is the membrane has a thin rejection layer on the order of 10 microns thick and a porous sublayer up to 300 microns thick) and may be formed by an immersion precipitation process. The membranes are either unbacked, or have a very open backing that does not impede water reaching the rejection layer, or are hydrophilic and easily wick water to the membrane. Thus, for mechanical strength they may be cast upon a hydrophobic porous sheet backing, wherein the porous sheet is either woven or non-woven but having at least about 30% open area. The woven backing sheet is a polyester screen having a total thickness of about 65 microns (polyester screen) and total asymmetric membrane is 165 microns in thickness. The asymmetric membrane may be cast by an immersion precipitation process by casting a cellulose material onto a polyester screen. The polyester screen may be 65 microns thick, 55% open area.

For the exemplary purposes of this disclosure, osmotic agents may generally be inorganic salt based or sugar-based. For example, an osmotic agent may be Sodium chloride=6.21 wt %; Potassium chloride=7.92 wt %, Trisodium citrate=10.41 wt %, Glucose=58.24 wt %, and Fructose=17.22 wt %. Other osmotic agents (or hydration formulations) include, for example, medicines within a dextrose formulation, dehydrated foods, and any other solute that can be hydrated with water.

A sugar-based osmotic agent can be powders or syrups made from the following: fructose, sucrose, glucose, sodium citrate, potassium citrate, citric acid, potassium ascorbate, sodium ascorbate, ascorbic acid, water soluble vitamins, sodium chloride, and potassium chloride. For example, a mixture of 60% fructose, 10% potassium citrate, 10% sodium citrate and 20% water was tested in the 30 cm element and had performance similar to 80% fructose—20% water nutrient syrup.

Various center tube, spiral wound FO membrane element, and/or spiral wound FO membrane system implementations may be manufactured using conventional procedures as added to and improved upon through the procedures described here. Some components defining center tube, spiral wound FO membrane element, and/or spiral wound FO membrane system implementations may be manufactured simultaneously and integrally joined with one another, while other components may be purchased pre-manufactured or manufactured separately and then assembled with the integral components.

Manufacture of these components separately or simultaneously may involve extrusion, pultrusion, vacuum forming, injection molding, blow molding, resin transfer molding, casting, forging, cold rolling, milling, drilling, reaming, turning, grinding, stamping, cutting, bending, welding, soldering, hardening, riveting, punching, plating, and/or the like. If any of the components are manufactured separately, they may then be coupled with one another in any manner, such as with adhesive, a weld, a fastener, wiring, any combination thereof, and/or the like for example, depending on, among other considerations, the particular material forming the components.

For the exemplary purposes of this disclosure, in one implementation a process for making a spiral wound membrane element or module may include: (a) assembling an envelope sandwich; (b) assembling a center tube onto the envelope sandwich; and (c) wrapping the envelope sandwich having the center tube and glue to form the spiral wound membrane module.

Use

Implementations of a center tube, a membrane element, and/or a membrane system are particularly useful in FO/water treatment applications as previously explained. Implementations may be used in multiple-element industrial-scale FO membrane housings because the fluid can be pumped through them in parallel, not in series. There are no additive pressure drops from the torturous pathway and sufficient flow rate of OA is possible.

However, implementations are not limited to uses relating to FO applications. Rather, any description relating to FO applications is for the exemplary purposes of this disclosure, and implementations may also be used with similar results in a variety of other applications. For example, center tube, membrane element, and/or membrane system implementations may also be used for pressure retarded osmosis systems. The difference is that pressure retarded osmosis generates osmotic pressure to drive a turbine or other energy-generating device. All that would be needed is to switch to feeding fresh water into the center tube (as opposed to OA as described herein) and the salt water feed can be fed to the outside instead of source water (for water treatment applications).

In places where the description above refers to particular implementations, it should be readily apparent that a number of modifications may be made without departing from the spirit thereof and that these implementations may be alternatively applied. The accompanying CLAIMS are intended to cover such modifications as would fall within the true spirit and scope of the disclosure set forth in this document. The presently disclosed implementations are, therefore, to be considered in all respects as illustrative and not restrictive, the scope of the disclosure being indicated by the appended CLAIMS rather than the foregoing DESCRIPTION. All changes that come within the meaning of and range of equivalency of the CLAIMS are intended to be embraced therein.

The invention claimed is:

1. A spiral wound membrane element comprising:
a center tube comprising:
a cylindrical housing having an inlet end and an outlet end;
an upstream chamber within the housing and having an opening at the inlet end of the housing;
a downstream chamber within the housing and having an opening at the outlet end of the housing;
a barrier element within the housing between the upstream chamber and the downstream chamber;
an exit bypass tube disposed substantially within the upstream chamber and extending through the barrier element into the downstream chamber, the exit bypass tube having a first opening inside the downstream chamber and a second opening at the inlet end of the housing;
a feed bypass tube disposed substantially within the downstream chamber and extending through the barrier element into the upstream chamber, the feed bypass tube having a first opening inside the upstream chamber and a second opening at the outlet end of the housing;
a membrane envelope coupled to and in fluid communication with the center tube.

2. The spiral wound membrane element of claim 1 wherein the upstream and downstream chambers comprise a torturous interconnection path through the membrane envelope.

3. The spiral wound membrane element of claim 1 wherein the cylindrical housing comprises a perforation in fluid communication with the upstream chamber and a perforation in fluid communication with the downstream chamber.

4. The spiral wound membrane element of claim 1 wherein the barrier element is located at about a midpoint of the center tube.

5. The spiral wound membrane element of claim 1 further comprising an upstream barrier element at the inlet end of the housing and a downstream barrier element at the outlet end of the housing.

6. The spiral wound membrane element of claim 5, wherein the exit bypass tube and the feed bypass tube are not perforated.

7. The spiral wound membrane element of claim 5, wherein the upstream and downstream barrier elements each comprise a sealable stab and a stab receptacle.

8. The spiral wound membrane element of claim 1, wherein the
feed bypass tube is not in fluid communication with the downstream chamber; and
the exit bypass tube is not in fluid communication with the upstream chamber.

9. A spiral wound membrane system which allows a draw solution to flow through the system in parallel, the system comprising two or more spiral wound elements according to claim 1, wherein each element is connected by joining the outlet end of the housing of one element to the inlet end of the housing of a second element.

10. The spiral wound membrane system of claim 9 wherein the two or more membrane elements has only a single draw solution and feed connection at each end of the system to provide draw solution flow through each membrane element in a parallel configuration.

11. The spiral wound membrane system of claim 9 wherein the upstream chambers of the center tubes are connected together in parallel and the downstream chambers of the center tubes are connected together in parallel.

12. The spiral wound membrane system of claim 9 wherein the upstream chamber and downstream chamber of each center tube comprises a torturous interconnection path through each membrane envelope.

* * * * *